Sept. 15, 1959　　　G. V. YOUNG　　　2,904,224

SPREADER MECHANISM

Filed Sept. 9, 1957　　　3 Sheets-Sheet 1

INVENTOR.
GERALD V. YOUNG
BY *Whittemore, Hulbert*
*Belknap*
ATTORNEYS

Sept. 15, 1959 G. V. YOUNG 2,904,224
SPREADER MECHANISM

Filed Sept. 9, 1957 3 Sheets-Sheet 2

INVENTOR.
GERALD V. YOUNG
BY
ATTORNEYS

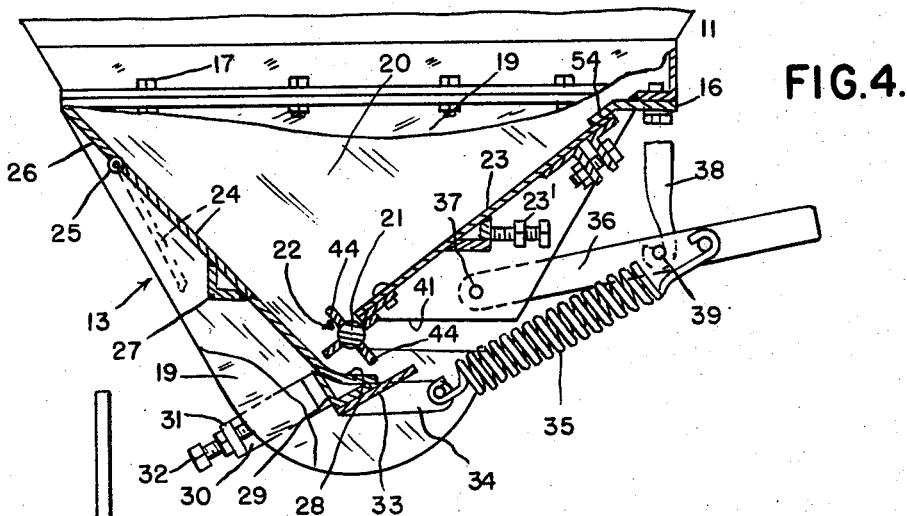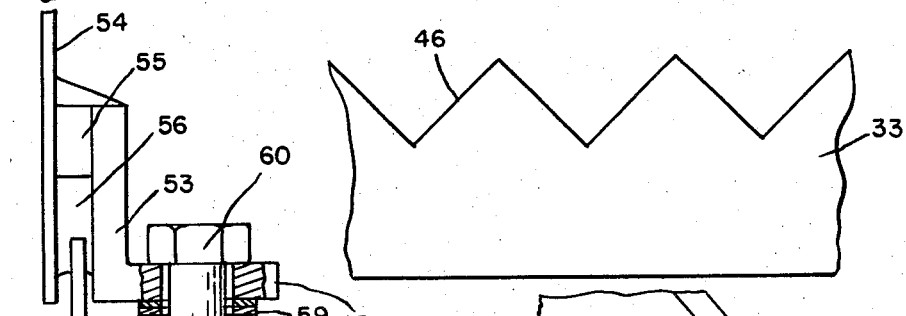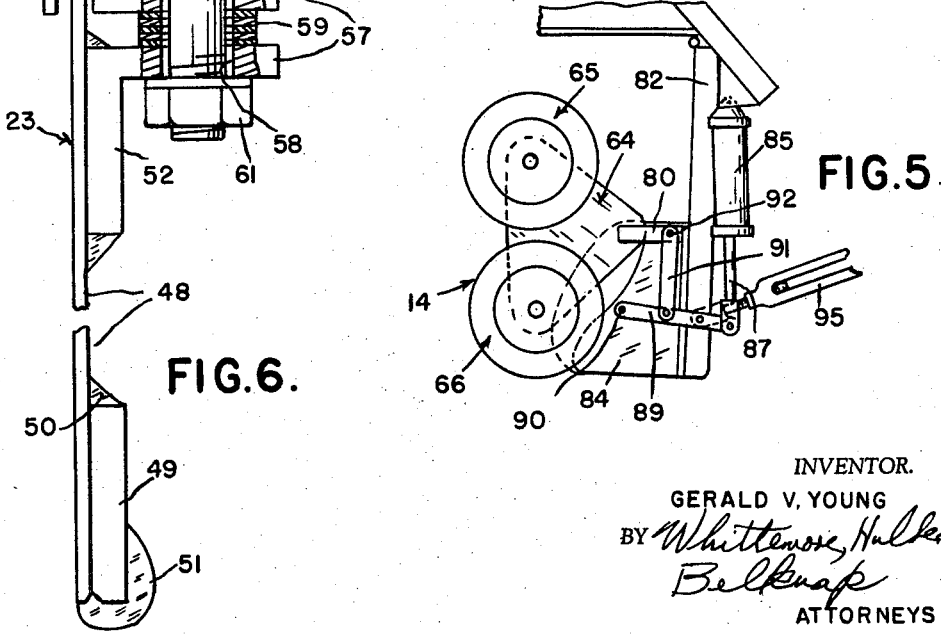

United States Patent Office 2,904,224
Patented Sept. 15, 1959

2,904,224

SPREADER MECHANISM

Gerald V. Young, Gladwin, Mich.

Application September 9, 1957, Serial No. 682,696

7 Claims. (Cl. 222—177)

The present invention relates to an improved spreader mechanism for distributing sand, chemicals and like discrete materials from a trailer, truck, or like vehicle of a type which discharges the material gravitationally or otherwise to the spreader for distribution. In its preferred application the spreader means is applied to a V-bottom type of trailer in the spreading of sand, chemicals and the like, as in road or highway maintenance or construction. However, it is to be understood that the invention is not particularly limited as to the character of the vehicle transporting it, and that the improvement may be employed in spreading other types of material than those specified.

It is a general object of the invention to provide a spreader mechanism of the sort described which is extremely rugged in construction, as well as simple and inexpensive in its parts, and which has improved provisions for quickly and easily applying the same to a trailer or like vehicle, as well as for removing the spreader as a whole when its use is not desired.

Another object is to provide a spreader featuring a discharge hopper or housing to which sand, chemical or like material is gravitationally or otherwise fed from the trailer, and improved rotary and oscillatable driven provisions within this hopper to lift and agitate the material for a better discharge through a lower throat opening of the hopper.

Another object is to provide spreader structure of this sort in which the hopper has improved means to eject large objects in the material in question without destructive jamming of its driven agitative parts, as described above.

More specifically, the invention has as an object the provision of a spreader mechanism having an inclined wall type discharge hopper of generally V-shaped cross-section, one inclined wall of which is, in the main, constituted by a rectangular snapping blade of large cross-section co-acting with a pick-up and agitator roller adjacent the lower extremity of this blade, the roller being located at the discharge throat of the hopper. As the roller is driven positively (by other improved features of the invention to be referred to) it engages the snapping blade to rapidly rock the latter about a relatively free or loose pivot of the blade to the body of the hopper, thus maintaining the mass of material in the hopper under constant lifting and dropping agitation by the snapping blade. Sand, chemical or other discrete material is thus kept freely flowable and insured against packing or agglomeration in the hopper prior to spreading.

Another specific object is to provide a material spreader in which a hopper of the type referred to above has another wall thereof constituted, in the main, by a hinged rectangular inclined wall acting adjacent a bladed lifting and agitating roller as a safety gate for the roller. This gate-like wall is resiliently urged toward the roller, with positive stop means limiting its movement in this direction, and it yields when the roller encounters large solid objects to prevent jamming of the latter and defacement or possible destruction to the roller blading.

In accordance with another object, the invention affords a hopper construction releasably attachable to a trailer or the like, in which the safety gate wall just mentioned is readily and quickly swung away manually from the roller for easy manual removal of jammed objects, if necessary.

A broad object is to provide a spreader of the type in question which has at its lifting and agitator roll or like material discharge member positively driven, preferably through an appropriate speed reduction unit, from a road or ground wheel of a trailer or like vehicle to which the spreader is applied.

As a refinement of the object just stated, a further object is the provision of a drive unit for the spreader discharge member which includes a pair of wheel engaging traction wheels or tires mounted on a rockable, or otherwise movably adjustable, support for selective frictional driving engagement with a ground wheel of the vehicle. As controlled by the vehicle operator these tires, when optionally engaged with the vehicle wheel, permit a drive of the agitator member at different speeds.

More specifically, the selective speed drive arrangement involves the driving of the hopper agitator roller, for example through a conventional speed reducer, by a chain and sprocket drive connection from the traction wheels or tires referred to, in which drive connection sprockets of different diameter rotate coaxially with the traction tires and optionally drive a chain trained about a power input sprocket of the speed reducer.

Another specific object is to provide a hopper driving unit of the above character which has an improved fluid pressure powered linkage for the remote control thereof from the operators' cab.

Other objects and features of the invention will become apparent as the description proceeds, especially when taken in conjunction with the accompanying drawings, wherein:

Fig. 4 is an elevational view of the hopper, as partially broken away and in vertical section in a plane at a right angle to its agitator roller;

Fig. 5 is a somewhat schematic side elevational view of the selectively operable, ground wheel engaging traction tire drive unit of the improved mechanism, and a powered operating linkage therefor;

Fig. 6 is an end view in enlarged scale of a snapping plate which may be used in the improved spreader hopper; and Fig. 7 is a fragmentary side view of a saw tooth type of hopper throat lip to improve distribution of the material spread upon discharge from the hopper.

Figure 1:
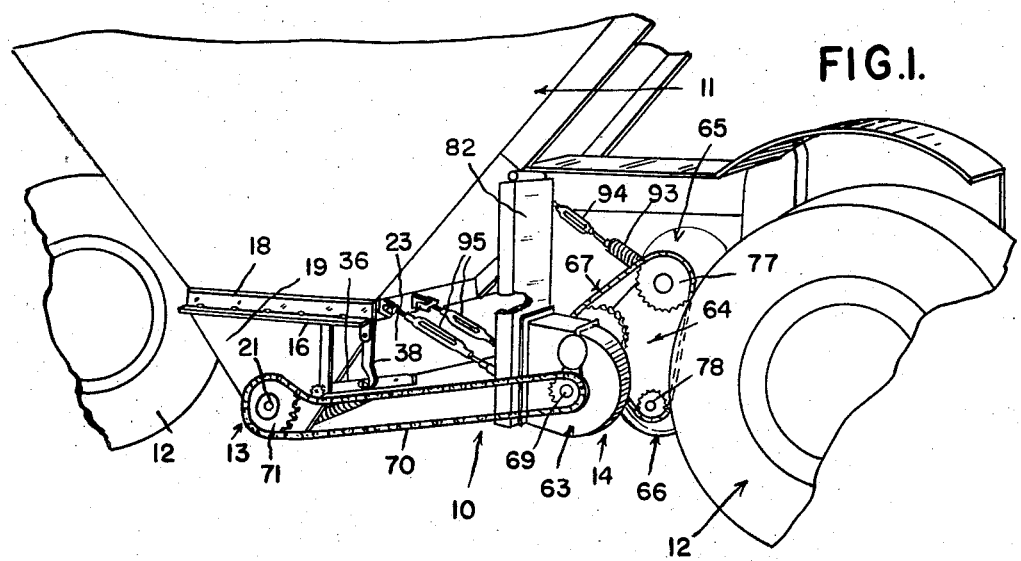
Fig. 1 is a fragmentary perspective view, partially broken away, illustrating the improved spreader mechanism as typically applied to a V-bottom type of trailer.

Referring first to Fig. 1 of the drawing, the improved spreader mechanism is generally designated 10, being shown as applied to a V-bottom type of trailer body 11, the ground or road wheels of which are designated 12. Of course, the trailer or equivalent body may be of any other desired type adapted to forward its contents, as through a suitable discharge opening, to the mechanism 10. Other features of the trailer 11, such as its internal construction, its provisions for mounting the body 11 on a chassis or like mobile wheeled support, etc., are not involved in the invention and are not illustrated.

The spreader mechanism 10 is composed generally of an improved hopper unit 13, which is also of an inclined wall, substantially V-shaped cross-section, and an improved traction drive unit 14. Improvements in both of the units 13, 14 which are afforded by the invention, as well as in their combination, will be discussed in their numbered order.

Figure 3:
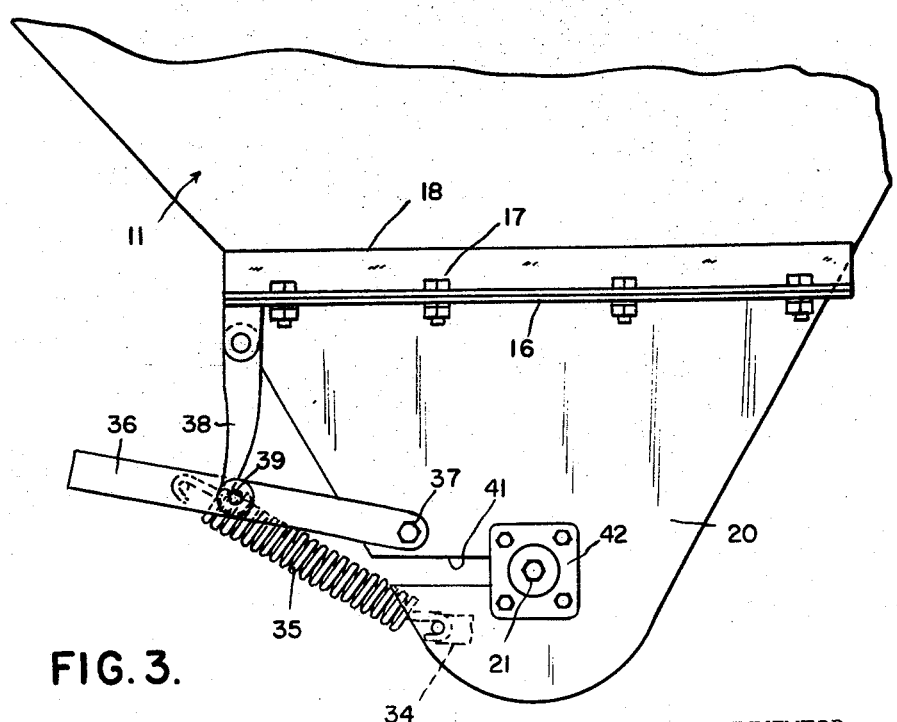
Fig. 3 is a fragmentary elevational view of the hopper unit of the spreader from the opposite side of the latter.
Figure 2:
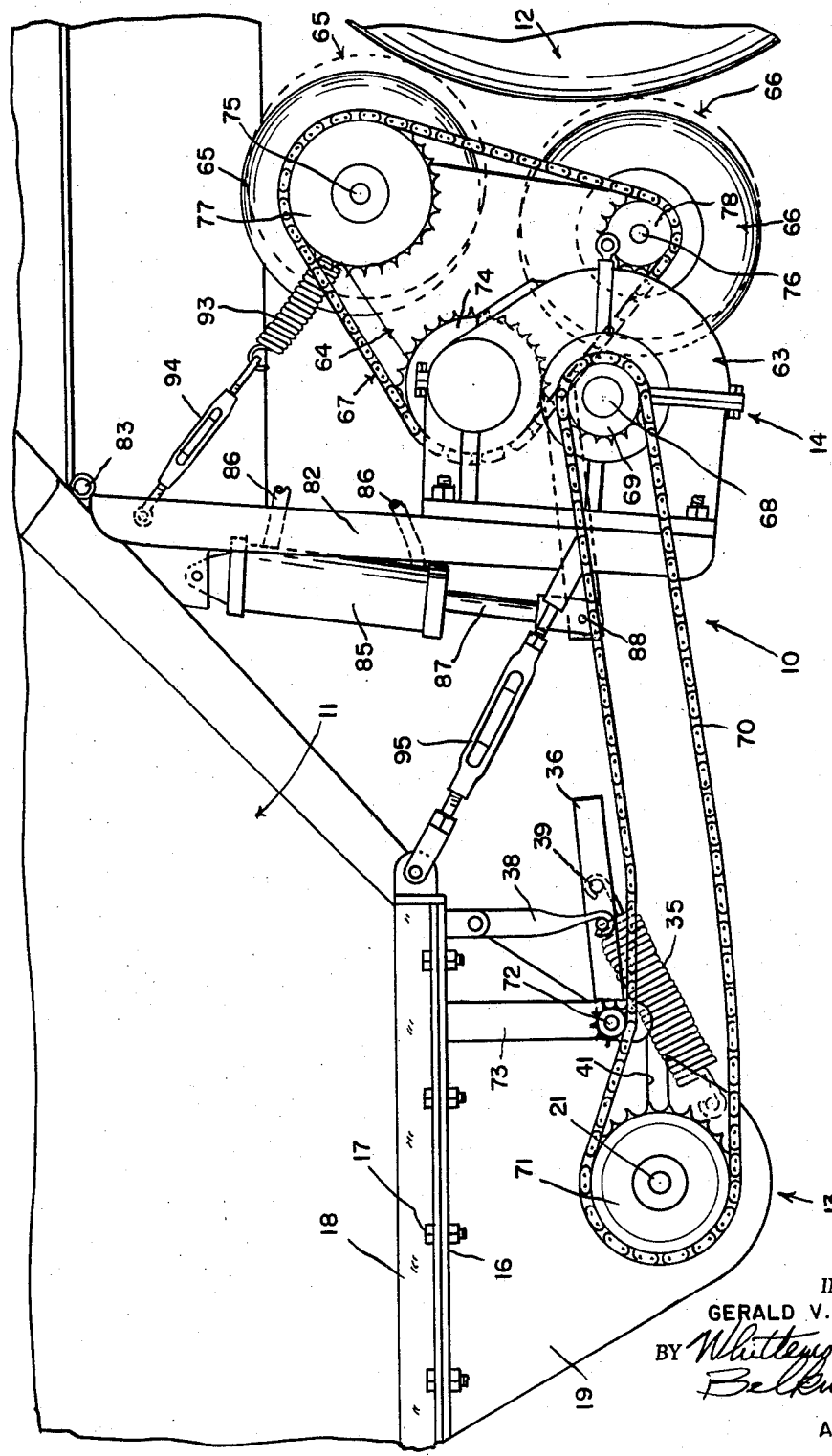
Fig. 2 is a fragmentary side elevation of the spreader, viewed from the side of the mechanism appearing in Fig. 1.

Referring now to Figs. 2, 3 and 4 in conjunction with Fig. 1, the hopper unit 13 includes an appropriate upper, laterally flanged mounting frame 16 of welded angle iron or the like in a rectangular outline, which frame is releasably secured by bolts 17 to a further rectangular angle iron frame 18 suitably fixed about the bottom discharge throat zone of the trailer body 11. A pair of opposed parallel and vertical plates 19, 20 secured as by welding to the frame 16 provide end walls for the hopper unit 13, and these walls journal in an improved way a horizontal, transversely extending shaft 21 of a bladed lifting and agitator roller 22 disposed within the hopper.

A rear inclined hopper wall, extending across the width of the hopper between end walls 19, 20, is provided, in the main, by a snapping plate or blade 23 of rectangular outline pivotally mounted to the frame 16 in a manner hereinafter described. The lower edge of snapping blade 23 rests upon the blading of the roller 22, and the blade is adjustably sustained in this position by threaded stop bolts 23' carried on the hopper end walls 19, 20, these stops engaging a bracing angle iron welded across the outer surface of the snapping blade 23.

A safety plate 24 corresponding in transverse width with snapping blade 23 constitutes a major portion of the forward inclined wall of the hopper unit 13, and the latter discharges through a throat defined by inclined blade 23 and plate 24 in which throat the lifting and agitating roller 22 is disposed.

As best illustrated in Fig. 4, the safety plate or wall 24 is appropriately hinged adjacent its top edge, as indicated at 25, to an inclined welded extension 26 of the mounting frame 16. If desired, it may be pivoted to the end walls 19, 20 of the hopper, or to both the frame and walls. Plate 24 is braced and rigidified medially of its inclined dimension, by an angle iron 27 welded horizontally therealong; and the plate is mildly rounded at 28 adjacent its lower extremity in concave relation to the roller 22, from which it is slightly spaced in the transverse or radial sense.

A further bracing angle iron 29 paralleling the iron 27 is welded along the outer surface of this curved plate extremity, having fixed thereon at either end a bracket 30 provided with a flanged outer finger 31. The fingers 31 laterally overhang the respective hopper end walls or plates 19, 20, and stop bolts 32 equipped with lock nuts are adjustably threaded in these bracket flanges to engage the adjacent edges of the respective plates 19, 20. The stops thus provided adjustably limit the inward position of the plate-like safety wall 24 as desired relative to roller 22, in accordance with the type of material to be spread, the desired thickness of the spread layer, etc.

An appropriate terminal lip 33 (hereinafter further described) may be fixedly applied to angle iron 29 to project rearwardly across the width of the concave safety plate extremity 28; the function of the lip 33 being to more uniformly distribute the discharged material at the zone of discharge.

In order to hold hopper safety plate 24 in the operative position of Fig. 4, the latter has a pair of rearwardly extending bars 34 welded thereto, as at the opposite ends of its throat angle iron 29.

A pair of coil tension springs 35 of substantial strength have their opposite ends hooked to the respective extension bars 34 and to respective manual release arms 36, which arms are pivoted at 37 to the two hopper end plates 19, 20; and hopper mounting frame 16 pivotally carries hooked holding links or hangers 38 adjacent its ends which swing in a front to rear direction. Each of these arms has releasably hooked engagement with a pin 39 on one of the release arms 36.

Accordingly, it is seen that if an unusually large and solid object is present in the material to be dispensed, its engagement with the bladed lifting roller 22 will simply cause the inclined front hopper plate or wall 24 to yield downwardly, as indicated in dotted line in Fig. 4, without destructively jamming the roller 22. If it is desired to remove such object, or if access to the interior of the hopper unit is desired for any other purpose without removing the same in its entirety from trailer body 11, the holding links 38 are simply disengaged from the arms 36, whereupon the inclined plate structure 24 may be bodily swung downwardly and outwardly to expose the hopper interior.

To the related end of affording ready access to and removability of the lifting and agitating roller 22, for example for inspection, replacement or repair, the hopper end walls 19, 20 are provided with horizontally disposed slots 41 which extend from the vertical midpoint of those walls and open through the rear edges thereof. As indicated in Fig. 3, the shaft 21 of the roller 22 is journaled at its ends in flanged mounting plates 42, which are releasably bolted to the outer surfaces of the walls 19, 20. This provides a simple means for the easy and quick removal and replacement of a roller 22.

Structural details of the roller 22 may vary; however, as herein constituted, it may comprise a plurality of individual blades 44 of suitably hardened or alloy steel welded along their length to the shaft 22, or to a suitable blade mounting body on the shaft.

As illustrated in Fig. 7, the distributor lip 33 is in the form of an elongated strip of appropriately hard, abrasion-resistant and, if desired, suitably flexible metal. It has a saw tooth shaped outer or rear edge 46 over which the material passes in discharging from the curved terminal extension 28 of the safety wall plate 24. A local spreading action is performed by the blade to better the distribution of the material on a road or other surface.

Reference should be had to Fig. 6, in conjunction with Fig. 4, for details of the snapping blade 23 and its mount. Blade 23 comprises a rectangular metal panel or plate element 48 coextensive in length, between hopper end walls 19, 20, with the distributing roller 22, as is the saw tooth distributing lip 33. A thicker backing strip 49 may be spot welded, as at 50, along the lower edge of plate element 48, with a build-up of rod-like protective shield 51, preferably of a self-hardening metal such as stainless steel, also welded or otherwise applied to the bottom edge extremity of the plate 23 and backing strip 49.

A length 52 of angle iron stock is spot welded along the horizontal length of the outer side of the blade element 48, this angle iron being spaced somewhat below the upper edge of the plate element; and a similar angle iron length 53 is also rigidly applied to an inclined extension 54 (Fig. 4) of mounting frame 16, with a spacer 55 interposed. This provides a longitudinally extending, blade seating recess 56 between the fixed iron 53 and frame extension 54, in which recess the upper edge of snapping plate 23 is received with substantial lateral clearance.

Parallel flanges 57 of the respective angle irons 52, 53 face one another and are drilled or punched to provide a series of aligned apertures 58 spaced along the length thereof. Appropriate spacing means are disposed between these flanges, such as stacks of washers 59 surrounding bolts 60 applied through the series of aligned apertures. The bolts are loosely received therein and nuts 61 are applied to the ends thereof, preferably by welding, with substantial clearance so as to permit free play of each bolt in its aperture.

As installed in the hopper unit 13, the snapping blade 23 thus has a loose but confined pivot in the seating recess 56, and its hardened edge 49, 51 rests on the roller 22. As the latter is rotated by the provisions to be described, the blade is lifted and dropped rapidly by the blades 44 of the roller, causing material which rests on the snapping blade to be strongly agitated by rapid and repeated tossing, and thus prevented from caking or agglomerating. A very effective maintenance of the material in a desired spreadable consistency is insured.

Now referring to Figs. 1, 2, 3 and 5, the drive unit 14 of the spreader 10 essentially comprises a conventional speed reducer device 63 (from which roller 22 is actuated as will be described), a rocker plate 64 of generally triangular shape, traction tires, pneumatic rollers or wheels 65, 66 by which power for the drive is derived from one of the ground wheels 12 of the trailer, and a chain and sprocket driving arrangement 67 connecting the tires 65 to speed reducer 63.

The output shaft 68 of speed reducer 63 has a sprocket fixed thereon which drivingly connects, through a flexible chain 70, with another sprocket 71 secured on the shaft 21 of agitator roller 22; an idler sprocket 72 for the purpose of adjusting slack in the chain 70 may be appropriately mounted adjustably, for example on an arm 73 pivotally carried by the hopper unit 13.

The input shaft (not shown as such) of the speed reducer 63, has a power input sprocket 74 secured thereon, for a purpose to be described. This input shaft may also serve as a pivot for the optional or selective adjustment of the rocker plate 64 referred to above, such pivot receiving a forwardly disposed corner of the rocker plate. In this connection, other appropriate bracket or like means may be provided to assist in pivoting rocker plate 64 at the point in question.

The remaining two corners of the plate 64 carry laterally extending pivot pins or rods 75, 76 upon which the respective upper and lower wheel engaging traction tires 65, 66 are freely journaled. These may be appropriate pneumatic tires, of small size and conventional type, mounted to rims and carried by appropriate wheel bodies, in a manner known to the art, to rotate on pivots 75, 76. The traction tires are selectively engageable with a rear ground wheel 12 of the vehicle in a manner and by means to be described.

Each of the tires 65, 66 has a sprocket fixedly secured coaxially thereto for rotation therewith. In the case of the upper traction tire 65, the sprocket is designated 77 and is of relatively large diameter; while in the case of the lower tire 66 its sprocket 78 is of relatively small diameter. A flexible drive chain 79 is trained about the sprockets 77, 78, as well as about the power input sprocket 74 of speed reducer 63.

Referring now to Fig. 5 in conjunction with Fig. 2, the rocker plate 64 has a bracket or like extension 80 rigidly welded thereto at its forward corner, preferably at the point of pivotal mounting of the plate 64 to the speed reducer 63, i.e., coaxial with its input shaft.

In the illustrated embodiment of the invention the speed reducer 63 is bolted to the rear side of a vertically elongated hanger 82 which is (as illustrated in Fig. 1) of strong and rugged channel shaped cross section. Hanger 82 is freely pivoted at its upper end, as indicated at 83, to an appropriate part of the trailer frame work, depending forwardly of its road wheel 12. Referring again to Fig. 5, the hanger 82 has a rigid sheet metal mounting plate 84 welded to its inner flange.

A conventional hydraulic cylinder 85 is also pivoted on the trailer framework in depending relation thereto, the cylinder 85 having the usual reverse acting plunger (not shown) therein; and the opposite ends of the cylinder have hydraulic lines 86 in communication therewith, pressure in these lines being controlled through conventional operator-manipulated valving (not shown). A connecting rod 87 extends downwardly from the cylinder plunger, being pivotally connected at 88 to the outer end of a rocker plate actuating lever 89, shown as being of the second class. This lever has an end pivot at 90 to the hanger plate 84, and an intermediate operating link 91 is medially pivoted to the lever, the upper end of this link being pivoted to the rocker plate bracket 80.

As shown best in Fig. 2, the rocker plate 64 is normally urged in a counter-clockwise direction, to take up play and vibration, by a coil spring 93 and associated adjustable turn buckle 94 connected to the upper end of hanger 82. The hanger is further rigidly braced in a desired adjusted position by means of a pair of turn buckles 95 pivoted at their opposite ends to the side flanges of hanger 82 and to the trailer body 11.

In operation, when the spreader mechanism is not being used, the traction driving tires 65, 66 of its drive unit 14 are held out of engagement with the ground wheel 12 of the trailer, as illustrated in solid line in Fig. 2. When it is desired to operate the mechanism with its agitating and lifting roller 22 being rotated at relatively slow speed, for a low rate of discharge and distribution of material, the hydraulic cylinder 85 is powered to urge its connecting rod 87 downwardly. This swings lever 89 downward, exerting tension on link 91, which acts through plate bracket 80 to swing the rocker plate 64 counterclockwise, as viewed in Fig. 2 (counterclockwise in Fig. 5) and thus engage the lower traction tire 66 with wheel 12 (dot dash line in Fig. 2). Driving sprocket 78 and chain 79 drive the input sprocket 74 of the speed reducer, to operate roller 22 at desired rate through the chain and sprocket connection from the reducer.

In the event a faster rate of distribution of material is desired, the cylinder 85 is reversed, elevating rod 87 and, through the linkage 89, 91, swinging rocker plate 64 in the opposite direction, thus to engage the upper traction tire 65 with the ground wheel 12. Due to the larger diameter of its sprocket 77, the chain and sprocket connections drive roller 22 at the desired faster rate.

It is evident that both the hopper unit 13 and the driver unit 14 of the mechanism 10 may be readily and quickly dismounted from the trailer, and as readily replaced. The unit 14 provides a selective speed traction drive for the mechanism which is rugged and efficient, yet simple and inexpensive as to its parts and the manner in which they are connected.

The operation of the hopper unit 13 has, it is believed, been adequately described. At any selected speed of operation material fed gravitationally thereto from trailer body 11 is kept in agitation and in steady flow by the associated roller 22 and snapping plate 23, with no possibility of damage by jamming, due to the improved spring-held safety wall 24. All parts are readily dismantled for inspection, servicing, repair or replacement.

What I claim as my invention is:

1. A spreader mechanism for association with a wheeled vehicle, comprising a discharge hopper unit having a material shifting element movably mounted thereon to act on material discharged thereby, a driving unit operatively connected to said element and comprising a pair of traction wheel members adjustably mounted adjacent a wheel of said vehicle for selective driving engagement with the latter, and a selectively operable, variable speed power transmitting connection between said wheel members and said hopper unit, including means for the different linear speed operation of said material shifting element in accordance with which traction wheel member engages said vehicle wheel.

2. A spreader mechanism for association with a wheeled vehicle, comprising a discharge hopper unit having a material shifting element movably mounted thereon to act on material discharged thereby, and a driving unit operatively connected to said element and comprising a pair of traction wheel members adjustably mounted adjacent a wheel of said vehicle for selective driving engagement with the latter, rotative power transmitting members operatively connected to said respective wheel members for rotation thereby, corresponding members of said respective wheel and power transmitting members being of different diameter for the different linear speed operation thereof in accordance with which traction wheel member engages said vehicle wheel, and means operatively connecting said driving unit with said shifting element of said power unit.

3. A spreader mechanism for association with a wheeled vehicle comprising a discharge hopper unit having a material shifting element movably mounted thereon to act on material discharged thereby, and a driving unit operatively connected to said element and comprising a pair of traction wheel members adjustably mounted adjacent a wheel of said vehicle for selective driving engagement with the latter, sprockets mounted on said respective wheel members for rotation thereby, said sprockets being of different diameter for the different linear speed operation thereof in accordance with which traction wheel member engages said vehicle wheel, and means operatively connecting said driving unit with said shifting element of said power unit, including a chain engaged with said power transmitting sprockets, and a speed reducer unit driven by said chain.

4. A material spreader mechanism for a vehicle, comprising a rotary element acting on material to be spread, a pair of traction wheels, a rockable support mounting said wheels in co-planar relation for selective frictional driving engagement with a ground wheel of the vehicle, sprockets rotating with said respective traction wheels, a chain engaged by said sprockets and driven by either thereof, in accordance with which engages said vehicle ground wheel, the wheel-sprocket radius ratio of the respective wheel and sprocket pairs being different, whereby said chain is driven at different speeds by said respective sprockets, and means driven by said chain and operatively connected to said rotary element to drive the latter.

5. A material spreader mechanism for a vehicle, comprising a rotary element acting on material to be spread, a pair of traction wheels, a rockable support mounting said wheels in co-planar relation for selective frictional driving engagement with a ground wheel of the vehicle, sprockets of different diameter rotating with said respective traction wheels, a chain engaged by said sprockets and driven by either thereof, in accordance with which engages said vehicle ground wheel, whereby said chain is driven at different speeds by said respective sprockets, and means driven by said chain and operatively connected to said rotary element to drive the latter.

6. A material spreader mechanism for a vehicle, comprising a rotary element acting on material to be spread, a pair of traction wheels, a rockable support mounting said wheels in co-planar relation for selective frictional driving engagement with a ground wheel of the vehicle, sprockets rotating with said respective traction wheels, a chain engaged by said sprockets and driven by either thereof, in accordance with which engages said vehicle ground wheel, the wheel-sprocket radius ratio of the respective wheel and sprocket pairs being different, whereby said chain is driven at different speeds by said respective sprockets, means driven by said chain and operatively connected to said rotary element to drive the latter, and selectively controlled power means to rock said support for selective traction-ground wheel engagement.

7. A material spreader mechanism for a vehicle, comprising a rotary element acting on material to be spread, a pair of traction wheels, a rockable support mounting said wheels in co-planar relation for selective frictional driving engagement with a ground wheel of the vehicle, sprockets of different diameter rotating with said respective traction wheels, a chain engaged by said sprockets and driven by either thereof, in accordance with which engages said vehicle ground wheel, whereby said chain is driven at different speeds by said respective sprockets, means including a speed reducer unit driven by said chain and operatively connected to said rotary element to drive the latter, and selectively controlled power means to rock said support for selective traction-ground wheel engagement.

References Cited in the file of this patent

UNITED STATES PATENTS

| | | |
|---|---|---|
| 85,379 | Going | Dec. 29, 1868 |
| 1,554,145 | Vugrinec | Sept. 15, 1925 |
| 2,620,094 | Swenson | Dec. 2, 1952 |
| 2,728,492 | Fox | Dec. 27, 1955 |
| 2,742,196 | Grether | Apr. 17, 1956 |
| 2,792,065 | Cole | May 14, 1957 |